(12) United States Patent
Armbruster, Jr. et al.

(10) Patent No.: US 11,796,440 B2
(45) Date of Patent: *Oct. 24, 2023

(54) CONTINUOUS DUST ACCUMULATION MONITORING SYSTEM

(71) Applicant: Industrial Intelligence, Inc., Williamsburg, VA (US)

(72) Inventors: George T. Armbruster, Jr., Williamsburg, VA (US); Bruce Ferris, Richmond, VA (US); Shane Diller, Richmond, VA (US); Slava Orlov, Richmond, VA (US)

(73) Assignee: Industrial Intelligence, Inc., Williamsburg, VA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/690,419

(22) Filed: Mar. 9, 2022

(65) Prior Publication Data

US 2022/0205894 A1     Jun. 30, 2022

Related U.S. Application Data

(63) Continuation of application No. 17/136,221, filed on Dec. 29, 2020, now Pat. No. 11,300,493.

(60) Provisional application No. 63/061,991, filed on Aug. 6, 2020, provisional application No. 62/955,545, filed on Dec. 31, 2019.

(51) Int. Cl.
*G01N 15/06* (2006.01)
*G01N 21/94* (2006.01)
*G01N 15/00* (2006.01)

(52) U.S. Cl.
CPC ......... *G01N 15/0612* (2013.01); *G01N 21/94* (2013.01); *G01N 2015/0096* (2013.01)

(58) Field of Classification Search
CPC .... G01B 21/94; G01B 21/59; G01B 11/0608; G01B 11/0625; G08B 19/005; G08B 21/18; G01N 15/0612; G01N 2015/0096
USPC ........... 356/237.1–237.5, 601–623, 432–440
See application file for complete search history.

(56) References Cited

U.S. PATENT DOCUMENTS

| | | | | |
|---|---|---|---|---|
| 6,392,738 | B1* | 5/2002 | van de Pasch | G03F 7/707 |
| | | | | 355/53 |
| 6,850,328 | B1* | 2/2005 | Leirfall | G08B 21/00 |
| | | | | 356/432 |
| 11,262,300 | B2* | 3/2022 | Parsons | G01N 21/59 |
| 11,300,493 | B2* | 4/2022 | Armbruster, Jr. | G01N 15/0656 |
| 2019/0391075 | A1* | 12/2019 | Herrero | G02B 27/0006 |
| 2021/0164771 | A1* | 6/2021 | Noël | G01N 21/94 |
| 2023/0011225 | A1* | 1/2023 | Armbruster, Jr. | B08B 1/008 |
| 2023/0073484 | A1* | 3/2023 | Armbruster, Jr. | G01N 21/8851 |

* cited by examiner

*Primary Examiner* — Hoa Q Pham
(74) *Attorney, Agent, or Firm* — Williams Mullen; Thomas F. Bergert

(57) ABSTRACT

Embodiments of a continuous dust accumulation monitoring system comprise an enclosure adapted for use in electrical hazardous locations, a sample area for collecting ambient dust, a dust accumulation sensor assembly installed in the enclosure configured to generate a signal based on the amount of ambient dust collected on the sample area and a circuit board within the enclosure configured to receive the signal from the dust accumulation sensor assembly. The continuous dust accumulation monitoring system may be connected to system control hardware.

20 Claims, 11 Drawing Sheets

CONTINUOUS DUST ACCUMULATION MONITORING SYSTEM

RELATED APPLICATIONS

The following application is a continuation application of pending U.S. patent application Ser. No. 17/136,221 filed on Dec. 29, 2020, which claims priority to U.S. Provisional No. 63/061,991 filed Aug. 13, 2020 and U.S. Provisional No. 62/955,545 filed Dec. 31, 2019, all of which are herein incorporated by reference in their entireties.

FIELD OF THE INVENTION

The present invention relates to a monitor for dust accumulation, and more particularly, to a continuous dust accumulation monitoring system with a system control.

BACKGROUND

Combustible dust and hazardous dust remain a large concern in industries globally. As defined by the National Electric Code, Class II locations are those that are hazardous because of the presence of combustible dust. Class II locations are further divided into subdivisions, wherein Division 1 locations are defined as an area where the amount of combustible dust is either suspended in the air or accumulated on surfaces in a sufficient concentration to allow for ignition. The types of combustible dust are classified under Groups E, F and G. Group E and F dusts are considered conductive, whereas Group G dusts are not.

Industries with potential dust hazards are required to perform dust hazard analysis at their plants to identify and document potential dust hazards and develop a plan to mitigate fires and hazards. The Occupational Safety and Health Administration (OSHA) has a standard that industries must maintain plant cleanliness with combustible dust accumulations less than $\frac{1}{32}$" over any continuous 1,000 square foot area.

To date, the only way to measure dust accumulation is visually conducting inspections and checking dust accumulation levels using a gauge measurement tool that is typically the thickness of a US quarter. Personnel must physically measure dust to determine dust accumulation thickness, then assess whether the level of dust over a 1,000 square foot area is averaging over OSHA permissible limits of $\frac{1}{32}$". Physically monitoring dust accumulation in risk areas of a manufacturing plant using either self-policing plant personnel or regulatory personnel is time-consuming and an unrealistic way to continuously monitor dust accumulation levels 24/7.

There are currently no continuous dust accumulation monitors that are packaged in a Canadian Standards Association (CSA) or Underwriters Laboratories (UL) certified enclosure rated for use in Class II, Division I Groups E, F & G enclosures for continuous use in combustible dust areas. Nor is there a continuous dust accumulation monitor that is certified to be used in ATEX (a European Union directive for protection against explosive atmospheres) hazardous dust areas. Thus, there remains a need for continuous dust accumulation monitoring systems in a facility that is compliant with both US and European standards and does not require personnel to physically monitor the premises.

SUMMARY

To this end, a continuous dust accumulation monitoring system is provided. In some embodiments, the continuous dust accumulation monitoring system may utilize various types of wave scattering for measuring dust, including but not limited to visible, ultraviolet and infrared light scattering and back scattering. In some embodiments, the continuous dust accumulation monitoring system may utilize laser, magnetics, sonar, radar, digital camera or ultrasound technologies as possible measurement principles for continuously measuring dust as it accumulates. Multiple continuous dust accumulation monitoring systems may be installed throughout an industrial facility to continuously gather dust accumulation levels and relay this information to system control via a network node using a wired or wireless communication technology such as, but not limited to, Ethernet, optical fiber, Wi-Fi, LoRa, radio frequency (RF) or Bluetooth. Once data points are in the system control, the data can be analyzed using algorithms to determine continuous average dust accumulations in risks areas identified in an industrial plant. Alarms can be triggered once dust accumulations increase to unacceptable levels.

In one embodiment, the continuous dust accumulation monitoring system may include an enclosure adapted for use in electrical hazardous locations, a sample area (e.g., a sample area on an external surface of the enclosure) for collecting ambient dust, a dust accumulation sensor assembly installed in the enclosure configured to generate a signal based on the amount of ambient dust collected on the sample area and a circuit board within the enclosure configured to receive the signal from the dust accumulation sensor assembly. A mounting assembly may be included for mounting the enclosure onto a surface. Surfaces may include flat surfaces (e.g., the ground, workspaces, etc.) or curved surfaces (e.g., pipes, rails, etc.). In some embodiments, the sample area may be within the enclosure.

The continuous dust accumulation monitoring system may also include one or more communication terminals in connection with the circuit board. For example, the one or more communication terminals may include a wired or wireless communication terminal, an Ethernet communication terminal, a 4 . . . 20 mA signal current loop communication terminal, and a RS-485 communication terminal. In some embodiments, the wireless communication terminal uses a communication protocol such as Wi-Fi, LoRa, radio frequency and Bluetooth.

In some embodiments, the continuous dust accumulation monitoring system may include an antenna for transmitting the signal to another device. For example, the antenna may transmit the signal to a network node. The network node may comprise a wireless repeater adapted to relay the signal to another wireless repeater or a wireless router installed on a computer. The signal may be uploaded to a server such as a cloud-based data acquisition system.

The dust accumulation sensor assembly may include one or more sensors selected from the group comprising an optical sensor, a magnetic sensor, an electrostatic sensor, a radar sensor, a sonar sensor, a photo sensor and a load cell. Examples of suitable optical sensors include laser sensors, infrared sensors, ambient light sensors, UV light sensors and LED sensors.

In some embodiments, the optical sensor is configured to measure the amount of ambient dust collected on the sample area using light scattering. In some embodiments, the optical sensor is configured to measure the amount of ambient dust collected on the sample area using backscattering. In some embodiments, the optical sensor is configured to measure the amount of ambient dust collected on the sample area using light absorption.

The continuous dust accumulation monitoring system may further include one or more local communication ports connected to the circuit board adapted to communicate with a computing device connected to the local communication port. For example, the local communication port may be an Ethernet, HDMI or USB port.

The continuous dust accumulation monitoring system may include an alarm system connected to the circuit board, wherein the circuit board provides an alert signal to the alarm system when the dust accumulated on the sample area has exceeded a threshold. For example, the circuit board may provide an alert signal to the alarm system when the dust accumulated on the sample area has exceeded a threshold of about 1/32 inches.

These and other aspects of the invention will become apparent to those skilled in the art after a reading of the following description of the embodiments when considered with the drawings.

BRIEF DESCRIPTIONS OF THE DRAWINGS

DETAILED DESCRIPTION OF THE EMBODIMENTS

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

All patents, patent applications and publications referred to herein are incorporated by reference in their entirety. In case of a conflict in terminology, the present specification is controlling.

Figure 1:
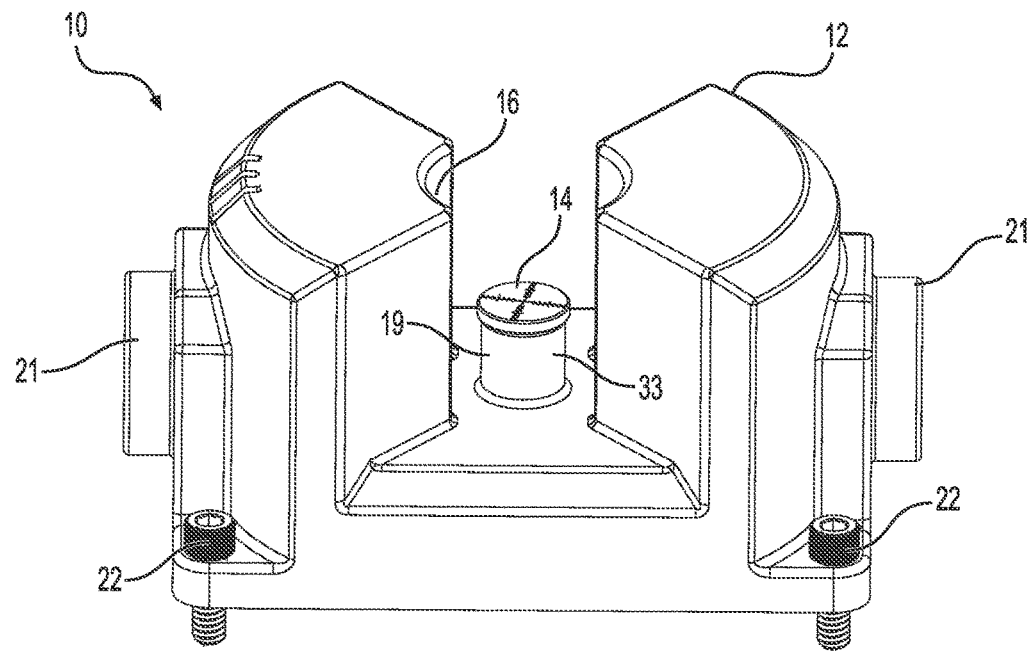
FIG. 1 is a front perspective view of a continuous dust accumulation monitoring system according to one embodiment.
Figure 2:
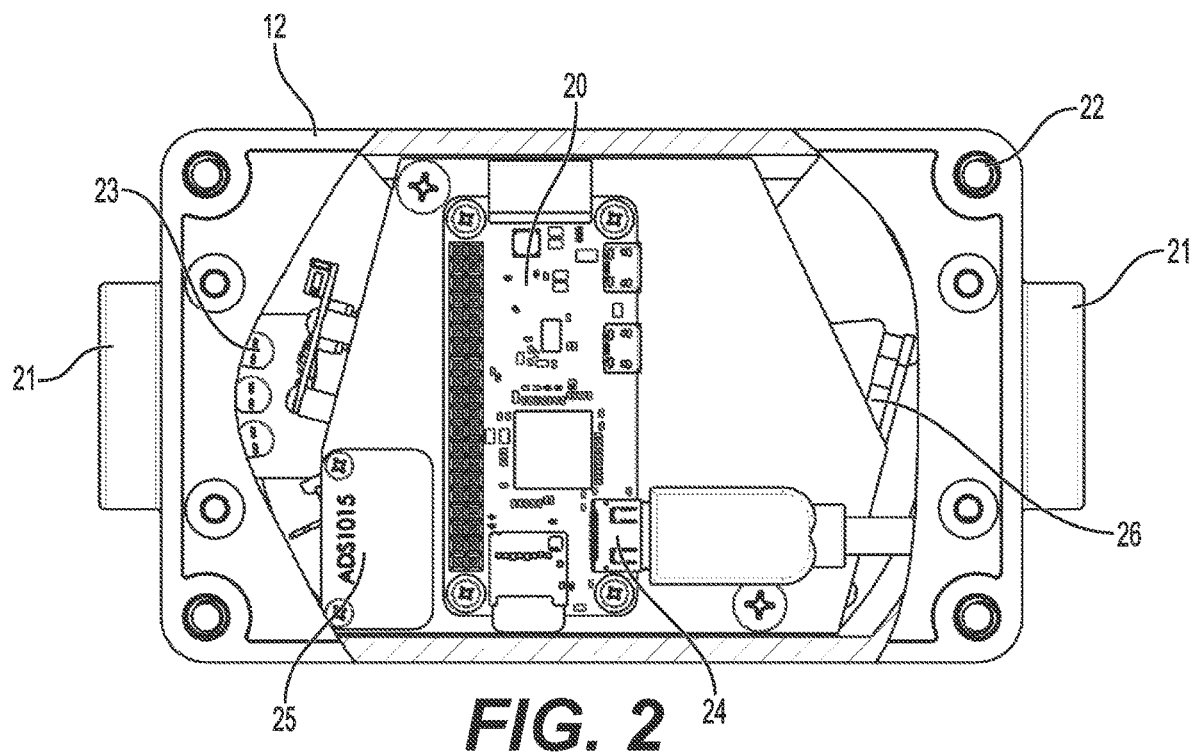
FIG. 2 is a bottom plan view of the continuous dust accumulation monitoring system shown in FIG. 1 with the enclosure removed.
Figure 3:
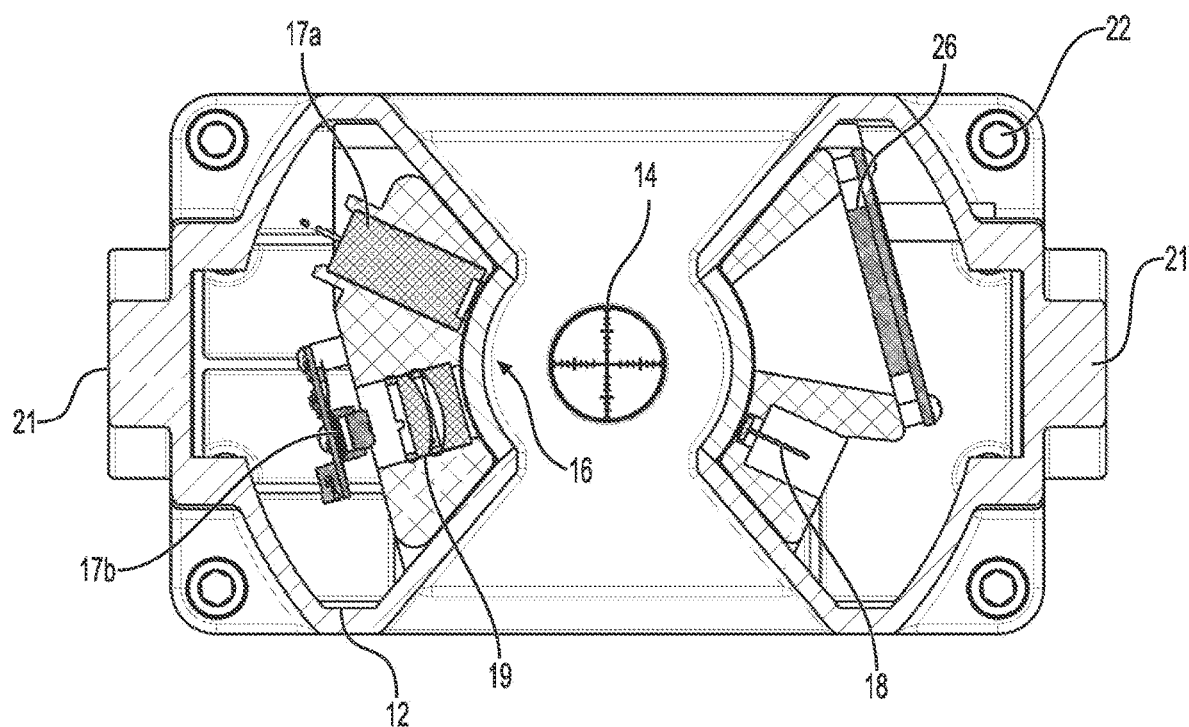
FIG. 3 is a top plan view of the continuous dust accumulation monitoring system shown in FIG. 1 with the enclosure removed.

In accordance with the present invention, a continuous dust accumulation monitoring system is provided. As seen in FIGS. 1-3, the continuous dust accumulation monitoring system 10 comprises an enclosure 12 and a sample area 14 for collecting ambient dust. The amount of ambient dust collected on the sample area 14 is measured using a dust accumulation sensor assembly 16 installed within enclosure 12.

The enclosure 12 may be configured to be UL/CSA certified for use in at least the following electrical hazardous categories: Class 1 Groups B, C and D; Class 2, Division 1, Subgroups E, F & G; Class 3 Type 4X; Class 1 Zone 1 AEx d IIC; and Ex d IIC IEC 60529 IP66. In one embodiment, the enclosure 12 may be approximately 3-6" diameter in a metal enclosure. The enclosure 12 may alternatively be configured as a box-type shape. The enclosure 12 may further include a mounting assembly 22 for mounting the enclosure 12 onto a surface. The enclosure 12 may further include conduits 21 as physical connections for attachment and/or running wires to/from the continuous dust accumulation system.

As seen in FIG. 2, the monitoring system 10 further includes a circuit board 20. The circuit board may include a processor, memory, dry contact relays, fuses for 24 VDC power, attenuation filter, alarm circuits, one or more communication terminals, antenna fuses and embedded software. The embedded software may include functional blocks such as test and measurement orchestration, image processing, communication management, self-test and calibration, alarm generation/management, etc.

A backup battery system may also be housed inside the enclosure 12. Examples of communication terminals include 4 ... 20 mA signal communication terminals, RS 485 communication terminals, Ethernet IP communication terminals, and wireless communication terminals such as RF communication terminals, Wi-Fi communication terminals, and Bluetooth communication terminals.

An antenna may be attached to the exterior of the enclosure 12 for RF, Wi-Fi and/or Bluetooth communication to a network node. In one embodiment, the network node may comprise a wireless (or wired) repeater 30 and a wireless (or wired) router 50 (shown in FIGS. 16 and 17, respectively) located in a customer's control room. Embodiments of the exterior of the enclosure 12 can employ one or more wiring ports to allow 24 VDC power and communication cabling to be wired to the monitoring system 10. Additionally, the monitoring system 10 may include a local communication port 24 located on the outside of the enclosure 12 for local computer connection. The local communication port 24 may be tied into the circuit board 20 and enable customers to locally program and monitor each monitoring system 10 at an installed location. Visual status indicators 23 (e.g., LED lights) may be included to indicate various states of the continuous dust accumulation monitoring system, including but not limited to a power status, connection to wiring port and/or local communication port 42, connectivity to a PLC/server and an error/malfunction status.

One or more alarm systems 31 may be in communication with the circuit board 20, wherein the circuit board 20 provides an alert signal to the alarm system 31 when the dust accumulated on the sample area 14 has exceeded a threshold. For example, the circuit board may provide an alert signal to the alarm system 31 when the dust accumulated on the sample area has exceeded a threshold. For instance, the threshold may be defined by a dust height of about $1/32$, $1/16$ or $1/8$ inches. The thresholds may be predefined by a manufacturer or adjusted by an end-user. In one embodiment, the alarm system 31 may include a sound alarm such as a piezo alarm.

In some embodiments, the dust accumulation sensor assembly 16 may comprise an optical sensor 17 with a corresponding detector 18. For example, the optical sensor 17 may be an infrared red digital camera, a LED laser light to a receiver, a laser light to a carbon fiber receiver, or a laser light to a fiber optic cable receiver. The optical sensor 17 may detect and measure the amount of dust accumulated on the sample area using light scattering technology, backscattering technology, or light absorption technology.

Other embodiments of the dust accumulation sensor assembly may employ crystals, magnetic or electrostatic sensors to measure the amount of dust accumulated on the sample area. Radar or sonar sensors may also be used to measure accumulated dust. Some embodiments may also employ a load cell for measuring and/or verifying the amount of accumulated dust on the sample area 14. The sensor assembly 16 may be adapted to accurately measure dust accumulation level between the range of 0 inches to 1 inch and 0 mm to 25 mm and monitor dust particles as low as 0.1 microns.

In some embodiments, the dust accumulation sensor assembly 16 may comprise one or more sensors 17. For example, the sensor assembly 16 may comprise two or more sensors. In some embodiments, the two or more sensors 17 may comprise a single type of sensor (e.g., an optical sensor), while in other embodiments the two or more sensors may comprise multiple types of sensors (e.g., an optical sensor in combination with a load cell).

In some embodiments, a digital camera may be used in combination with one or more sensors to measure and/or verify the amount of accumulated dust on the sample area. For example, a digital camera and laser may be used. In some embodiments, the digital camera may also be configured to measure additional properties of dust in the environment. For example, the digital camera may be configured to measure the size of dust particles and/or the concentration of dust that is airborne near the sample area.

Figure 4:
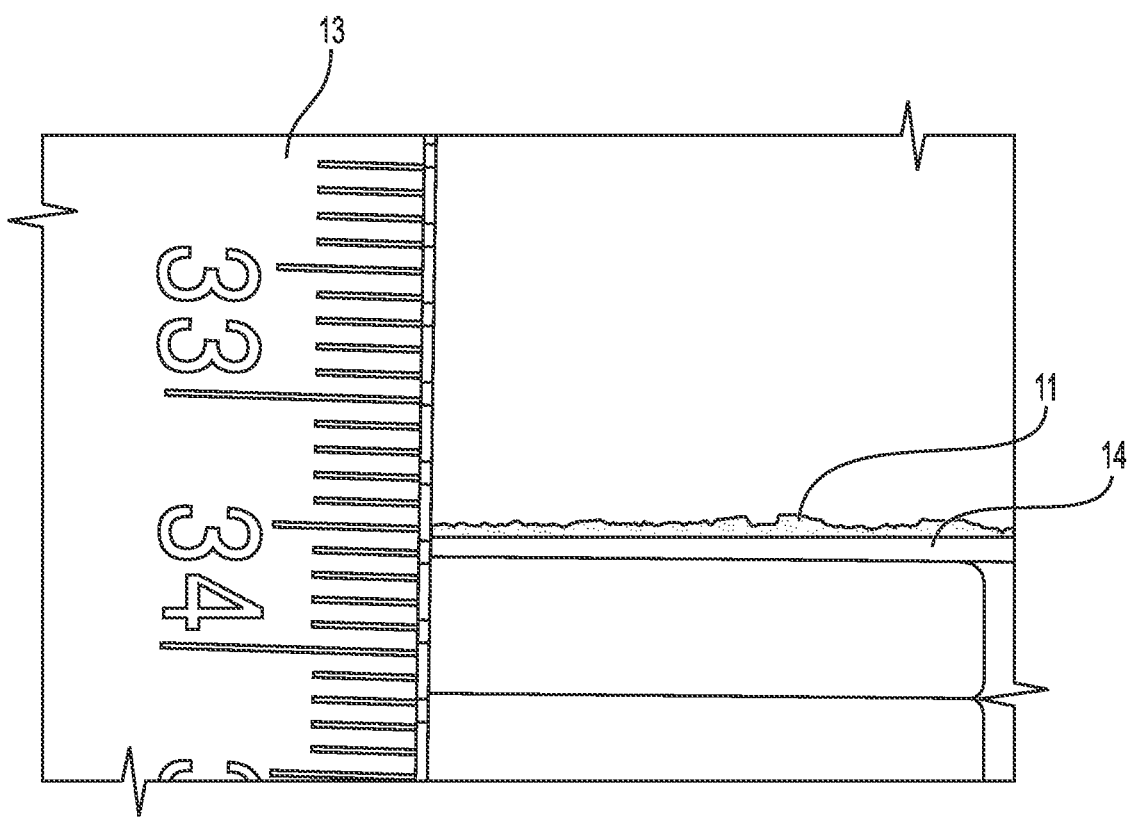
FIG. 4 is an enlarged front perspective view of a sample area with a scale for measuring dust height according to one embodiment.

FIG. 3 is one example of a continuous dust accumulation monitoring system 10 having multiple sensors. As seen in FIG. 3, the dust accumulation sensor assembly 16 is comprised of a laser 17a and a camera 17b. The laser 17a is detected by the photoresistor 18. As dust accumulates on the sample area 14, dust height may be measured by the reduction in opacity of the laser 17a as detected by the photoresistor 18. The camera 17b may be used to visually determine the height of accumulated dust 11 on the sample area. As seen in FIG. 4, a scale 13 may be included to measure the height of accumulated dust 11. In some embodiments, the circuit board 20 may further include software utilizing machine/computer vision and machine learning to automatically detect when the dust height reaches and/or exceeds a dust level threshold. The continuous dust accumulation monitoring system 10 may include a screen (e.g., LCD, LED, OLED, etc.), as shown in FIG. 3, which may be used to provide a scale 13. An optical system 25 comprised of one or more lenses (e.g., concave and/or convex lenses) may be used to provide a desired focal length.

In one embodiment, the continuous dust accumulation sensor assembly 16 comprises one sensor 17 wherein the height of the sensor is adjustable. For example, the sensor 17 may be mounted onto a platform 19 having an adjustable height. The adjustable height may be useful for modifying dust level thresholds or for providing a measurement for dust levels present on the sample area 14. In some embodiments, the sample area 14 may comprise a platform 19 with internal threadings to receive a screw 33 on the bottom of the sample area 14 as seen in FIG. 1. The height of the platform 19 may be adjusted by turning the screw in the desired direction.

Figure 5:
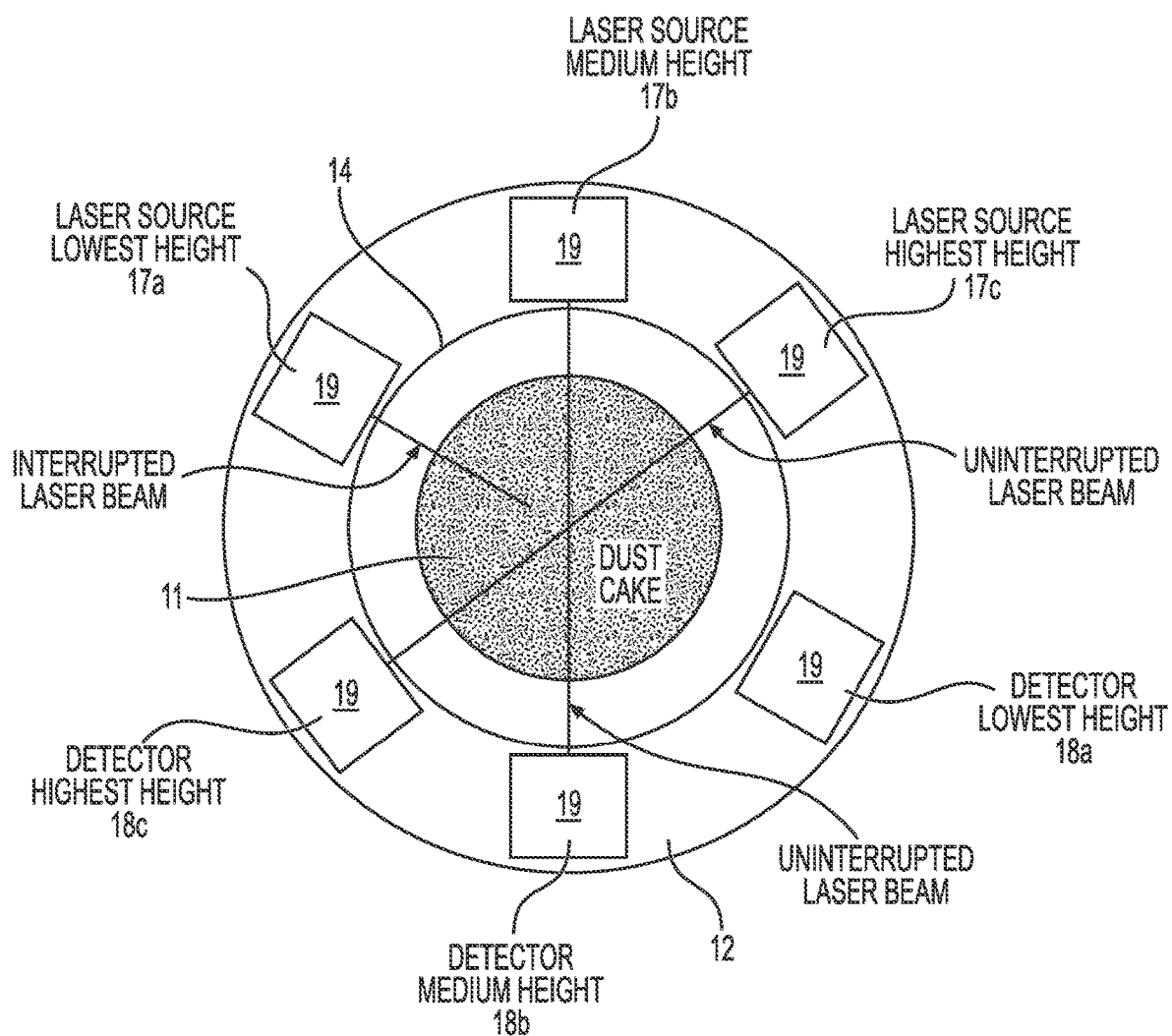
FIG. 5 is a top plan view of a continuous dust accumulation monitoring system according to one embodiment.

FIG. 5 depicts one embodiment of a continuous dust accumulation monitoring system 10' with laser sensors 17a, 17b and 17c and corresponding detectors 18a, 18b and 18c. The laser sensors may be placed at different heights to indicate specific dust level thresholds. In some embodiments, the laser sensors and detectors may each be mounted on a platform 19 having an adjustable height. In other embodiments, the dust accumulation sensor may comprise a single laser sensor with a set of different detectors placed at different designated heights.

The continuous dust accumulation monitoring system 10 may further include an automated cleaning assembly configured to remove accumulated dust from the sample area 14. In some embodiments, the automated cleaning assembly may utilize one or more mechanisms for removing accumulated dust off the surface area, such as acoustic, vibratory, airflow (e.g., via fans) and/or compressed air. For example, the automated cleaning assembly may be a vibration assembly that uses one or more high frequencies to cause the accumulated dust on the surface area to become airborne. An air pulse may be used in conjunction with the vibration assembly to remove the airborne and accumulated dust from the area.

Figure 6:
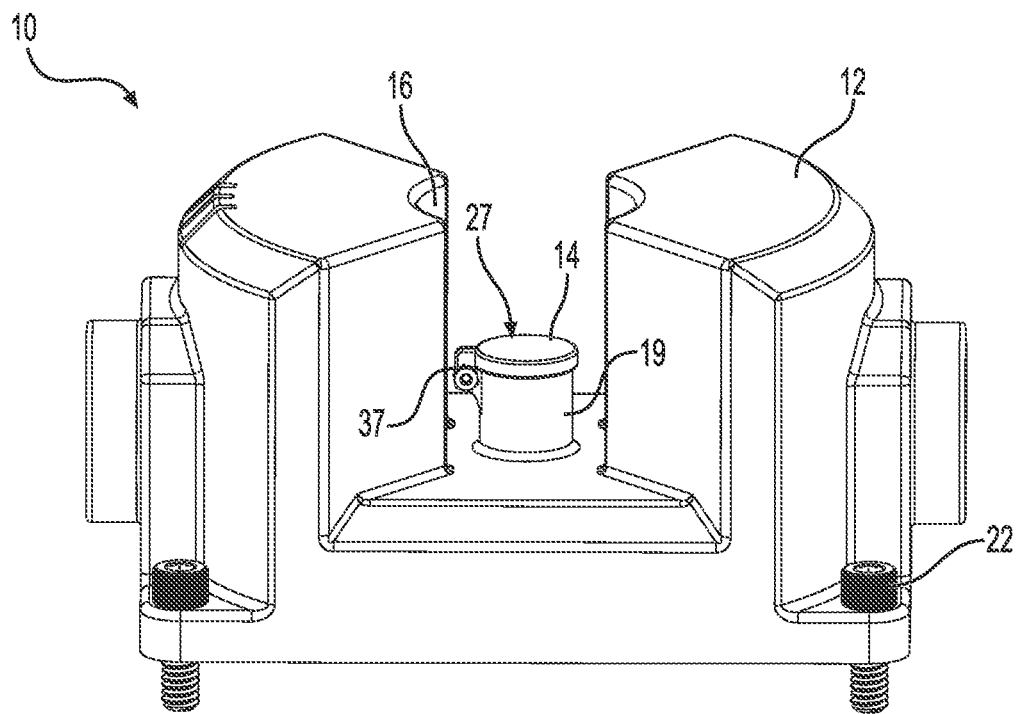
FIG. 6 is a front perspective view of a continuous dust accumulation monitoring system with an automated cleaning assembly according to one embodiment.
Figure 7:
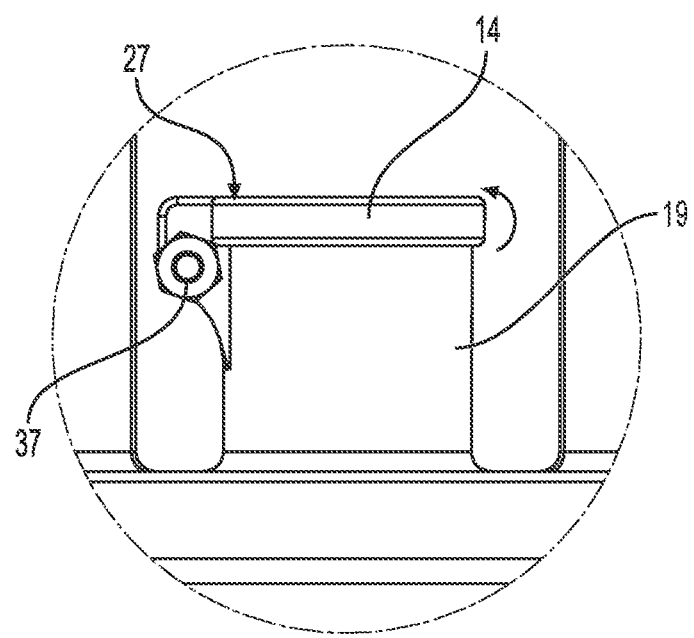
FIG. 7 is an enlarged front elevation view of the sample area and automated cleaning assembly shown in FIG. 6.

FIGS. 6 and 7 illustrate one embodiment of a continuous dust accumulation monitoring system with an automated cleaning assembly comprising a lid assembly 27. The lid assembly 27 comprises a sample area 14 on top of and connected to a platform 19 via a hinge 37. Dust is collected on the sample area 14 and may be removed by rotating the sample area 14 upward for the dust to fall off of its top. For example, the bottom of the sample area 14 may be struck by a solenoid within the platform, which jettisons the sample area 14 upward. Since the sample area 14 is hingedly connected to the platform (e.g., via a bolt or a pin), the lid rotates and eventually stops (e.g., via a physical stop). Although the sample area 14 is stopped from further rotation, the dust collected on the sample area surface 14 will continue to move due to inertia and therefore is removed from the surface of the sample area 14.

Figure 8:
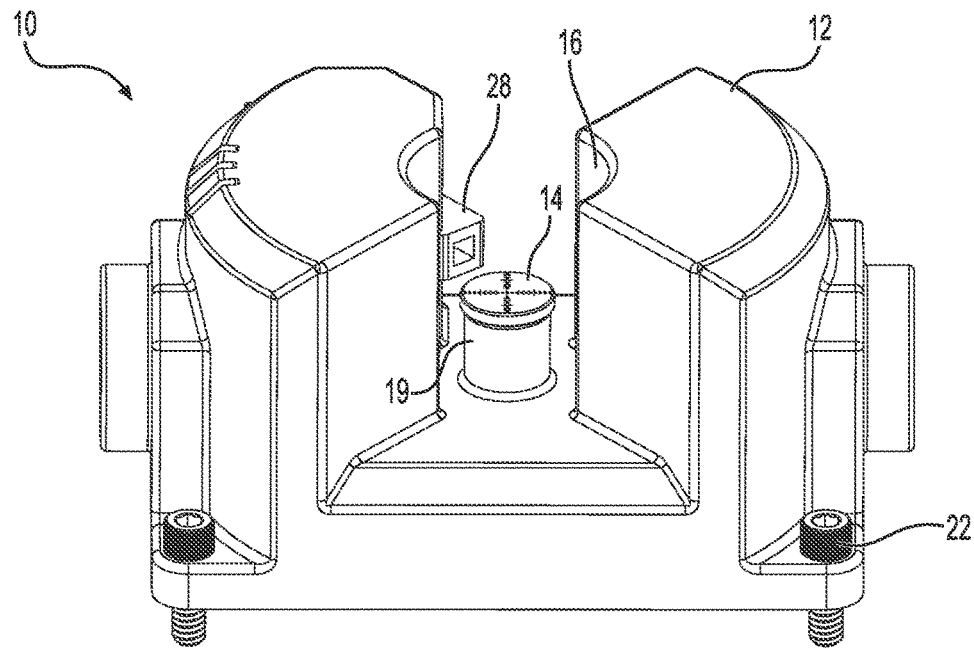
FIG. 8 is a front perspective view of a continuous dust accumulation monitoring system with an automated cleaning assembly according to one embodiment.
Figure 9:
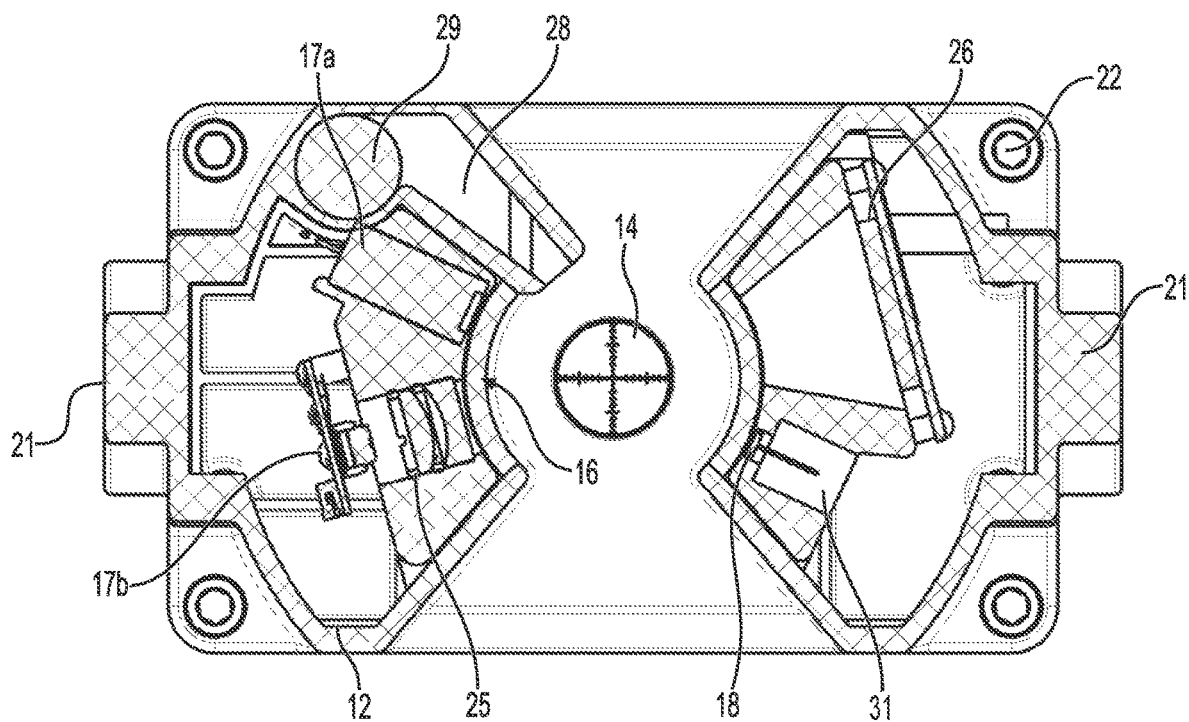
FIG. 9 is a bottom plan view of the continuous dust accumulation monitoring system shown in FIG. 8 with the enclosure removed.

Another embodiment of an automated cleaning assembly is shown in FIGS. 8 and 9. In this embodiment, the automated cleaning assembly is an airflow-based cleaning assembly. The airflow-based cleaning assembly comprises a fan 29 within a channel 28. During operation of the cleaning assembly, the fan 29 blows air out of the channel 28 to remove dust from the sample area 14.

Figure 10:
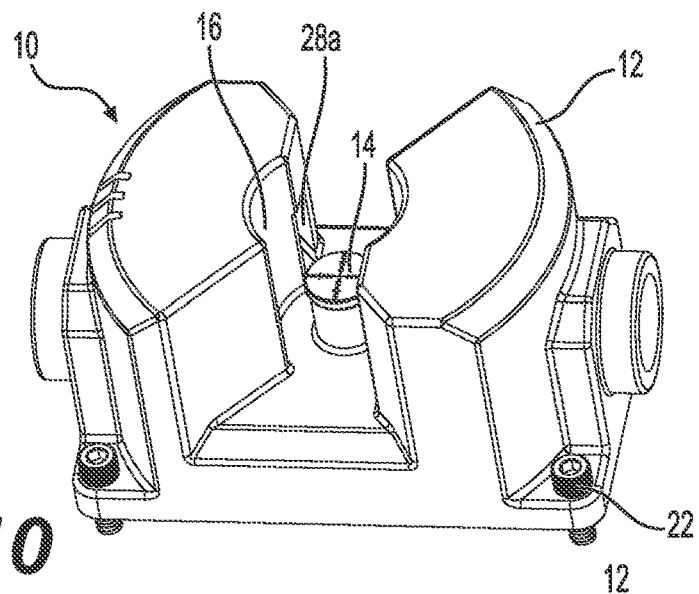
FIG. 10 is a right side perspective view of a continuous dust accumulation monitoring system with an automated cleaning assembly according to one embodiment.
Figure 11:
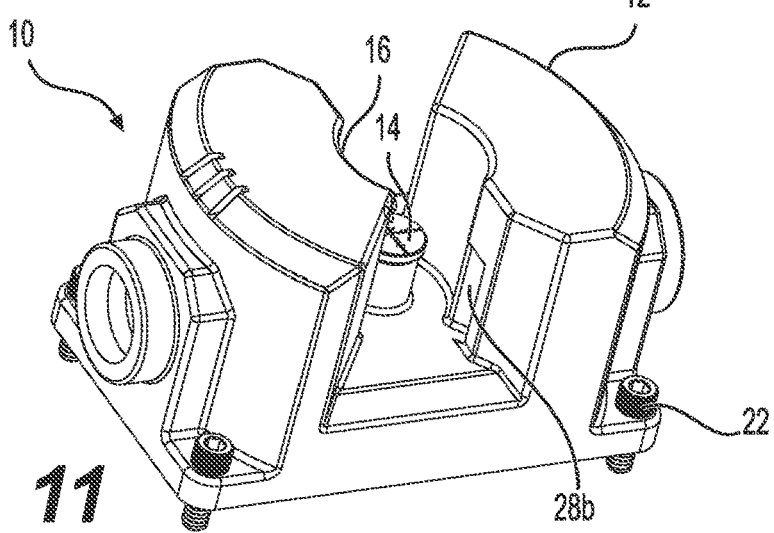
FIG. 11 is left side perspective view of the continuous dust accumulation monitoring system shown in FIG. 10.
Figure 12:
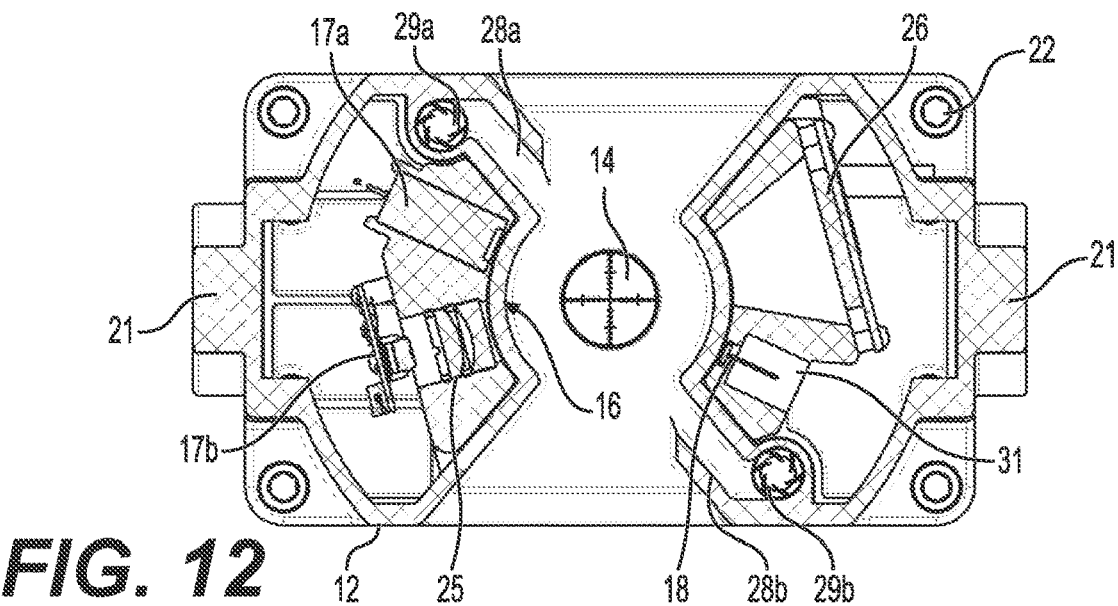
FIG. 12 is a bottom plan view of the continuous dust accumulation monitoring system shown in FIG. 10 with the enclosure removed.

FIGS. 10-12 illustrate another embodiment of an airflow-based cleaning assembly with dual air vents on each side of the sample area 14. As seen in FIG. 12, the airflow-based cleaning assembly comprises a first channel 28*a* and second channel 28*b* diagonally opposed to each other. A first fan 29*a* is positioned within an interior of the first vent 28*a* and a second fan 29*b* is positioned within an interior of the second vent 28*b*. Each fan may be a centrifugal fan and an air intake may be included at the bottom of each centrifugal fan. During operation of the airflow-based cleaning assembly, the first and second centrifugal fans pull air in from their respective air intakes to blow air out of their respective channels to create a cyclical air current that blows dust away from the sample area 14.

The automated cleaning assembly enables the continuous dust accumulation monitoring system to self-clean the sample area and eliminate the need for manual cleaning by personnel. In certain embodiments, the digital camera may be configured to monitor and verify whether the sample area has been cleaned by the automated cleaning assembly. Moreover, the digital camera may be configured to measure one or more properties from the airborne dust caused by a vibration assembly, including measuring the size of dust particles and/or the concentration of dust as previously discussed.

In some embodiments, the continuous dust accumulation monitoring system further includes one or more additional sensors configured to measure additional properties in the ambient area. For example, sensors may be employed to measure the humidity, airflow and/or temperature of the surrounding environment.

Figure 13:
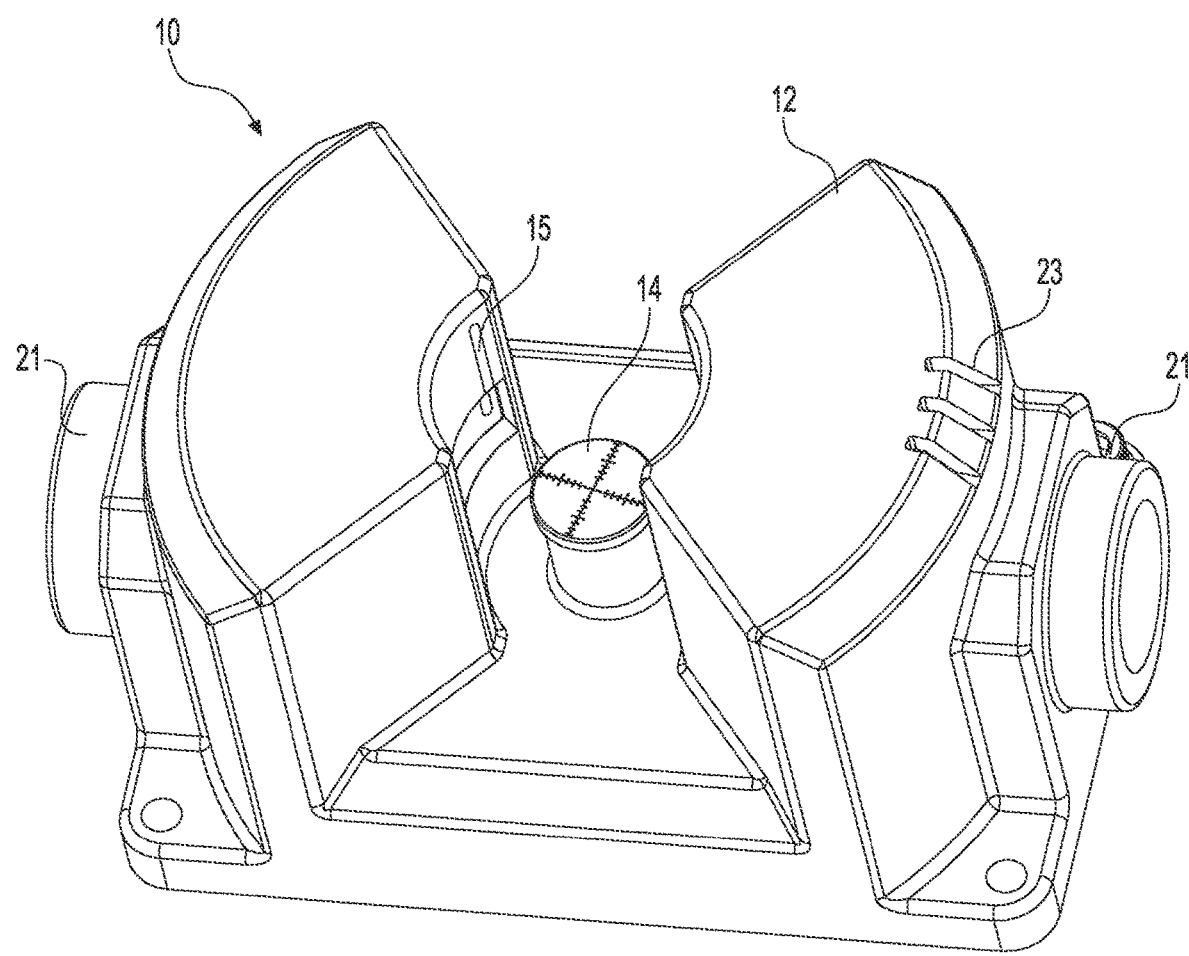
FIG. 13 is a front perspective view of a continuous dust accumulation monitoring system with a line laser according to one embodiment.

In some embodiments, the dust accumulation sensor 16 may be a laser system. For example, the system may use a dot laser to measure dust height on a sample area. Preferred embodiments of a laser system utilize a line laser as shown in FIG. 13, which provides greater accuracy and reliability in determining accumulated dust height. The line laser system may be oriented vertically, horizontally or at an angle.

Figure 14:
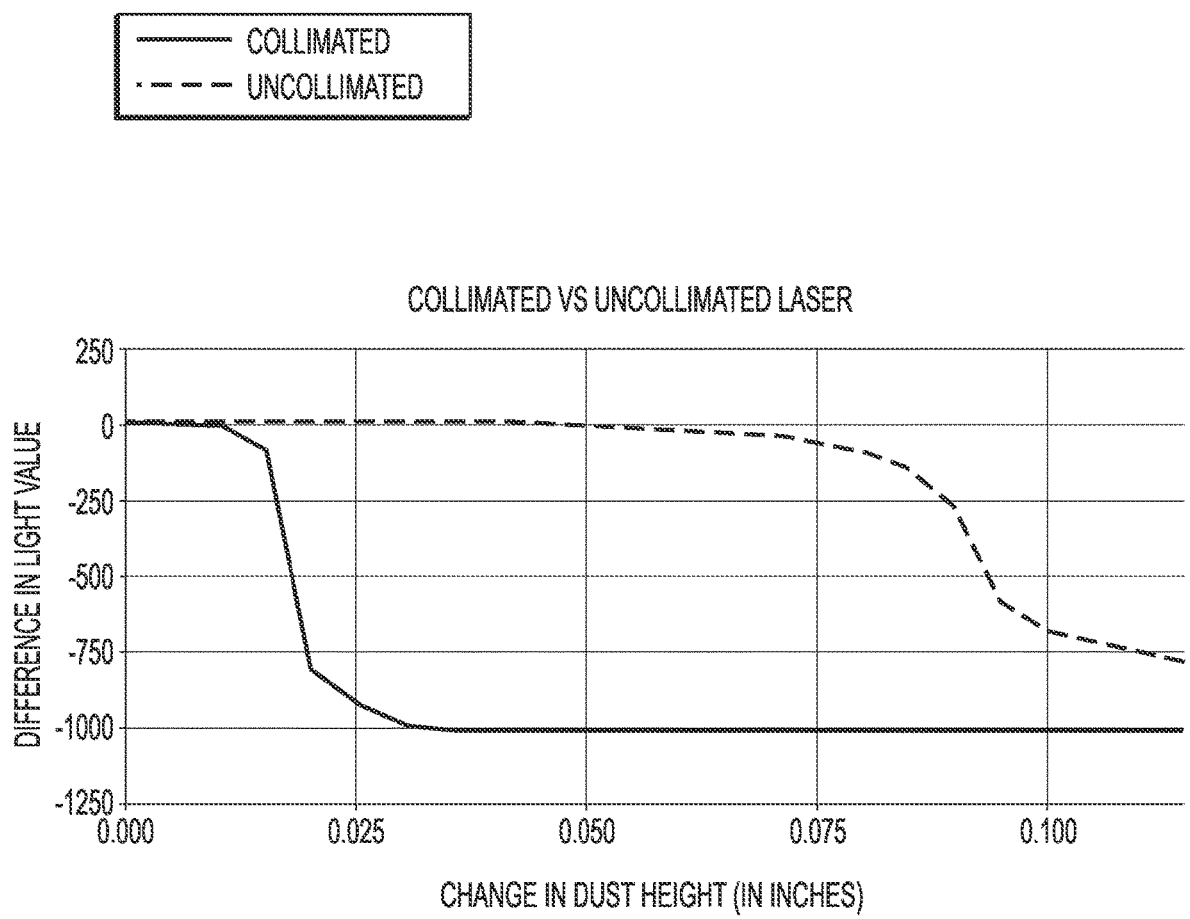
FIG. 14 is a graph disclosing the differences for measuring dust height accumulated on a sample area using a collimated versus an uncollimated laser.

FIG. 14 compares the performance of a collimated laser versus an uncollimated laser. The collimated laser is depicted by the lower curve and the uncollimated laser is depicted by the upper curve. The graph shows that collimated lasers have a sensitivity useful for small changes in dust heights (about 0.015 inches). The signal from the uncollimated laser is not noticeably lower until a dust height of 0.075 inches is reached. This height is more than double what the allowable limit of OSHA is. Thus, preferred embodiments of a laser sensor utilize a collimated laser though some embodiments may still employ an uncollimated laser. In some embodiments, collimation may be achieved using a lens or a mirror. In other embodiments, collimation may be achieved by placing the receiver 18 in a recess of the enclosure 12. The recess may comprise a pinhole having a diameter proportional to the threshold for a dust height.

Figure 15:
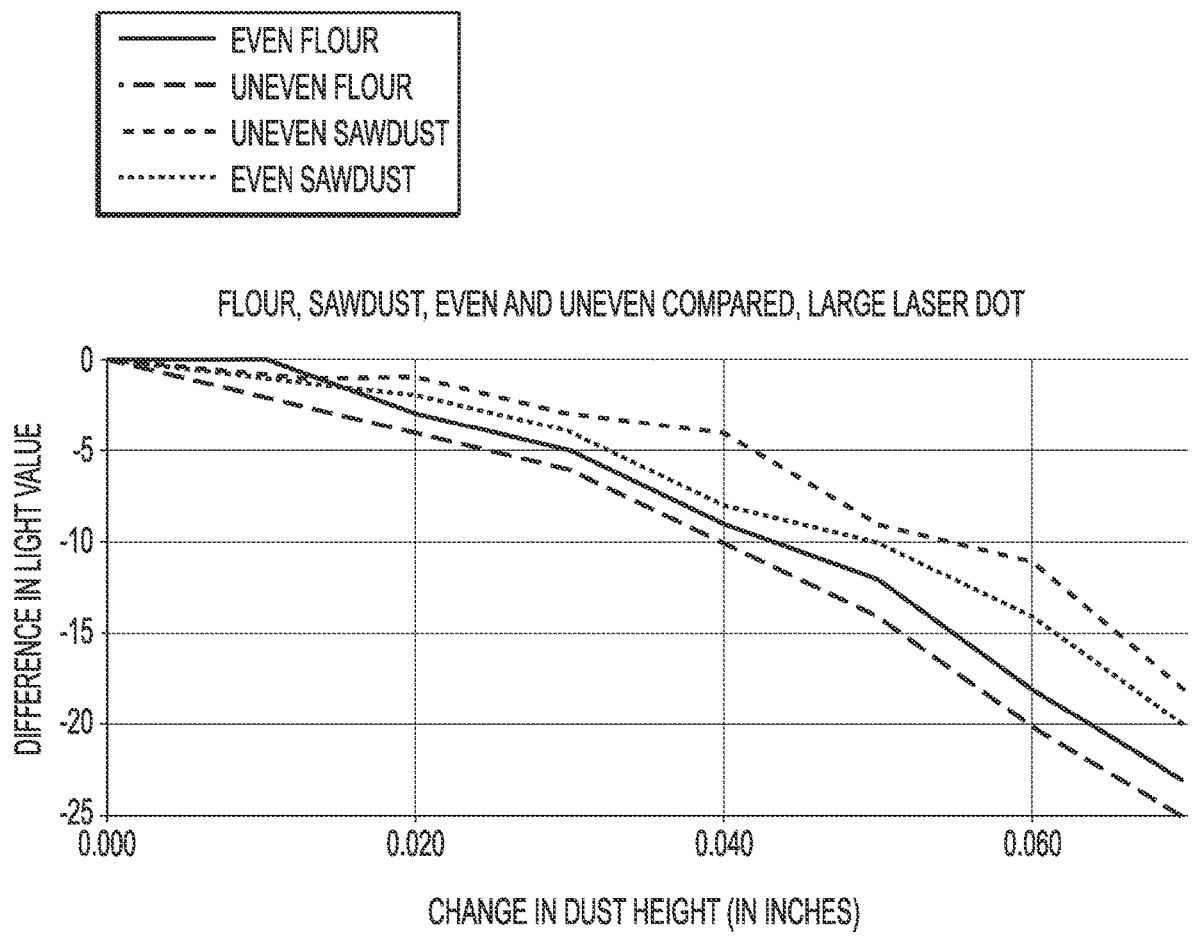
FIG. 15 is a graph measuring heights for various types of dust accumulated on a sample area of a continuous dust accumulation monitoring system.

FIG. 15 compares dust heights for a variety of different dust types and accumulation patterns, including flour distributed evenly along the sample area surface, flour distributed unevenly along the sample area surface, sawdust distributed evenly along the sample area surface, and sawdust distributed unevenly along the sample area surface. The results indicate that this embodiment is capable of accurately measuring heights for a variety of dust types and distribution patterns along the sample area surface.

In operation, the sensor assembly 16 is adapted to continuously measure dust levels as it accumulates on the sample area 14 and relay this information via hardwire communication (4 . . . 20 mA signal, RS-485 or Ethernet IP) and/or wireless communication using RF, Wi-Fi or Bluetooth to a wireless repeater 30 or a central wireless router 50 located in a customer's control room. One or more wireless repeaters 30 may be installed at a location to relay signals from individual monitoring systems 10 to a central wireless router in a control room if signal interruptions are detected between the monitoring system 10 and a central wireless router 50.

Figure 16:
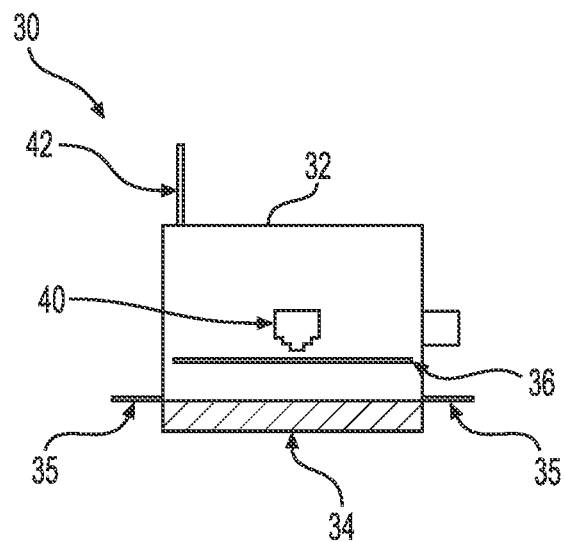
FIG. 16 is a side elevation view of a wireless repeater according to one embodiment.

FIG. 16 depicts one embodiment of a wireless repeater 30 with a circuit board 36 adapted to relay wireless signals from monitoring system 10 back to a central wireless router 50. The wireless repeater 30 may be encased in a metal enclosure 32 with two access ports. One port may be configured for accepting an incoming 24 VDC power supply to the wireless repeater 30. The second port may be a communication port 40 located on the outside of the enclosure 32 for connecting the circuit board 36 to a local computer. The wireless repeater 30 may further include an antenna 42 connected to a circuit board 36 and mounted externally to the metal enclosure 32. The enclosure 32 may further include a mounting assembly 34 with holes 35 for mounting the enclosure 32 onto a surface.

Figure 17:
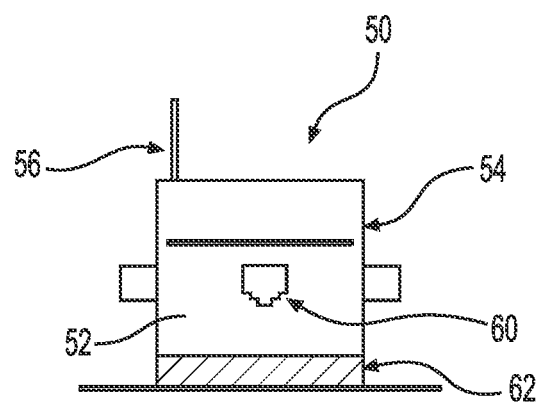
FIG. 17 is a side elevation view of a wireless router according to one embodiment.

FIG. 17 illustrates one embodiment of a central wireless router 50 adapted to communicate with a wireless repeater 30 and/or monitoring system 10. The wireless router 50 includes an enclosure 52 having the same UL/CSA certifications as the monitoring system 10. The enclosure 52 may further include a mounting assembly 62 with holes 63 for mounting the enclosure 52 onto a surface. A built-in circuit board 54 installed in the enclosure may be embedded software to allow RF, Wi-Fi and Bluetooth communication with the wireless repeater 30 and/or monitoring system 10 via antenna 56. The central wireless router 50 may also include a communication port 60 configured to receive hardwired communication via 4 . . . 20 mA, RS 485, Ethernet IP. The wireless router 50 may also be connected to the internet allowing data to be routed to system control. Additionally, the circuit board 54 may include an attenuation filter, a power source and antenna fuses.

Once the wireless router 50 receives data from the monitoring system 10 or wireless repeater 30, the wireless router 50 may use an internet connection to move the sensor data to a system control comprised of system control software and system control hardware. In one embodiment, the system control software may include software components such as a data acquisition system (e.g., sensor data including dust, temperature, humidity, airflow, etc.), data analysis, database and database management, predictive maintenance, and interfacing with other industrial systems. In one embodiment, the system control hardware may be a server. For instance, the server may be at a location such as an enterprise data center or may be cloud-based.

A customer can login to the server remotely and program individual monitoring systems 10 and adjust device alarm parameters. Customers may also remotely monitor average dust accumulations over specific areas or zones or at individual monitoring system units. The system control software may also be adapted to allow customers to route data back from the server to a plant or corporate server.

In various embodiments, each sensor is adapted to be programmed to setup alarm thresholds when average dust accumulation levels reach unacceptable levels. For example, two dry contact relays on the circuit board 20 could be used to activate horns, light or turn on and off equipment near the individual sensor. Additionally, the cloud-based system control software can be configured to alert plant and corporate personnel when alarm levels are reached. Data analytic tools can also be used to analyze dust accumulation data using the cloud-based system control software. In some embodiments, the system control software may have functional blocks including AI machine learning, predictive maintenance, data analytics and visualization, etc. The system control software may further be configured to perform system-level tasks such as system testing and calibration, database management, interface and integration with other industrial systems (including alarm and monitoring systems), interface and integrate with mobile devices, etc. The system control software may be configured to perform regulatory compliance task automation, including required record keeping, form generation, etc.

The system control may be configured to determine the rate of change of dust accumulation over set time intervals and graph the dust accumulation to determine if the rate of change is steady, linear or exponential so that a facility may make inferences about the functioning of equipment in a room where the continuous dust accumulation monitoring system is installed. For example, an equipment malfunction may be indicated by a sudden change in the rate that dust accumulates on a sample area. For instance, a dust accumulation system that typically accumulates $1/64"$ of dust over 3 months may experience a sudden accumulation of dust having a height of about 0.25" over 2 hours, which may indicate an equipment malfunction nearby the dust accumulation monitoring system (e.g., a loose hose).

Possible applications of the above system may include monitoring enclosed combustible dust areas inside manufacturing facilities such as grain mill bid deck areas, hammer mill rooms, truck & rail receiving & loadout areas, tunnels, elevator shafts, electrical chases, and above duct work, I-beams and build support structures, under-ground mine applications. Other applications may also include sifting rooms, mixing rooms, processing rooms, test cells for 3D printing, monitoring above ceiling tiles, and process manufacturing areas in the following industries: feed mills, grain mills, pet food plants, pharmaceutical, forest products industries to include plywood, OSB, particle board, and other forest products engineered wood, plastics, sugar refineries, fertilizer manufacturing, chemical & polymer manufacturing, ammunition manufacturing, metal manufacturing and processing operations, breweries, ethanol manufacturing, starch & gluten manufacturing, commercial bakeries and coal fired utilities. Other uses could include monitoring for non-combustible hazardous dust accumulation levels such as military installation & government building monitoring applications, research facilities, hospitals, construction sites concerned with nuisance or hazardous dust such as silica. The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more monitoring systems; and (b) one or more personal computing devices, such as desktop computers, laptop computers, tablet computers, personal digital assistants, mobile phones, and other mobile computing devices. Many of the tasks, such as remotely logging in to the server, programming individual monitoring systems, adjusting device alarm parameters and monitoring dust accumulations may be performed with personal computing devices.

Thus, in various embodiments, the system of the present disclosure includes: (a) one or more computing devices in combination with one or more monitoring systems; (b) one or more personal computing devices, and one or more monitoring systems, alone, or in combination with one another; (c) a single monitoring system; and/or (d) a plurality of monitoring systems in combination with one another.

In certain embodiments in which the system includes a personal computing device in combination with a monitoring system, the monitoring system includes any suitable circuit board that has at least one processor and at least one memory device or data storage device. As further described herein, the personal computing device includes at least one processor configured to transmit and receive data or signals representing events, messages, commands, or any other suitable information between the personal computing device and the monitoring system. The processor of the personal computing device is configured to execute the events, messages, or commands represented by such data or signals in conjunction with the operation of the personal computing device. Moreover, the processor of the monitoring system is configured to transmit and receive data or signals representing events, messages, commands, or any other suitable information between the monitoring system and the personal computing device. The processor of the monitoring system is configured to execute the events, messages, or commands represented by such data or signals in conjunction with the operation of the monitoring system.

In embodiments in which the system includes a personal computing device configured to communicate with a monitoring system through a data network, the data network is a local area network (LAN), a wide area network (WAN), a public network such as the Internet, or a private network. The monitoring system and the personal computing device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A continuous dust accumulation monitoring system comprising:
    an enclosure adapted for use in electrical hazardous locations, wherein the enclosure comprises an external surface comprising a floor;
    a sample area comprising a platform extending from the floor of the external surface of the enclosure for collecting ambient dust, wherein the platform is elevated above the floor; and
    a dust accumulation sensor assembly installed in the enclosure, wherein the dust accumulation sensor assembly comprises a camera secured within the enclosure and to the side of the sample area, wherein the sample area is within a field of view of the camera, wherein the dust accumulation sensor assembly is configured to measure dust height continuously via the camera as dust accumulates on the sample area, and wherein the dust accumulation sensor assembly is configured to generate a signal based on the dust height viewed by the camera on the sample area.

2. The continuous dust accumulation monitoring system of claim 1, wherein the camera provides a visual feed of the sample area and is configured to measure one or more of dust particle size and concentration of airborne dust.

3. The continuous dust accumulation monitoring system of claim 1, wherein the dust accumulation sensor assembly comprises the camera in combination with a laser sensor configured to measure dust height.

4. The continuous dust accumulation monitoring system of claim 1, wherein the height of the sample area is adjustable.

5. The continuous dust accumulation monitoring system of claim 1 further comprising a circuit board within the enclosure configured to receive the signal from the dust accumulation sensor assembly.

6. The continuous dust accumulation monitoring system of claim 5, further comprising a local communication port connected to the circuit board adapted to communicate with a computing device connected to the local communication port.

7. The continuous dust accumulation monitoring system of claim 5, further comprising an alarm system connected to the circuit board, wherein the circuit board provides an alert signal to the alarm system when the dust accumulated on the sample area has exceeded a threshold.

8. The continuous dust accumulation monitoring system of claim 1, wherein the dust accumulation sensor assembly comprises the camera in combination with an uncollimated light source.

9. The continuous dust accumulation monitoring system of claim 1, wherein the sample area comprises a first edge and a second edge, and wherein the dust accumulates on the sample area in an uneven distribution between the first edge and the second edge.

10. The continuous dust accumulation monitoring system of claim 9, wherein the first edge and the second edge are in the field of view of the camera.

11. The continuous dust accumulation monitoring system of claim 9, wherein the uneven distribution of the dust is in the field of view of the camera.

12. A continuous dust accumulation monitoring system comprising:
    an enclosure adapted for use in electrical hazardous locations;
    a sample area on an external surface of the enclosure for collecting ambient dust;
    a dust accumulation sensor assembly installed in the enclosure configured to generate a signal based on the amount of ambient dust collected on the sample area, wherein the dust accumulation sensor assembly comprises a camera secured within the enclosure and to the side of the sample area, wherein the dust accumulation sensor assembly is configured to measure dust height continuously via the camera as dust accumulates on the sample area; and
    a processing device configured to receive the signal from the dust accumulation sensor assembly and determine a rate of change of dust accumulation over time.

13. The continuous dust accumulation monitoring system of claim 12 wherein the processing device comprises a circuit board within the enclosure and a remote system control.

14. The continuous dust accumulation monitoring system of claim 13 wherein the circuit board is adapted to communicate with the system control, and wherein the system control is configured to determine the rate of change of dust accumulation over time.

15. The continuous dust accumulation monitoring system of claim 12, wherein the sample area comprises a first edge and a second edge, and wherein the dust accumulates on the sample area in an uneven distribution between the first edge and the second edge.

16. The continuous dust accumulation monitoring system of claim 15, wherein the first edge and the second edge are in the field of view of the camera.

17. The continuous dust accumulation monitoring system of claim 15, wherein the uneven distribution of the dust is in the field of view of the camera.

18. A continuous dust accumulation monitoring system comprising:
    a sample area comprising a platform comprising a first edge and a second edge;
    a dust accumulation sensor assembly comprising a camera positioned to the side of the sample area, wherein the sample area is within a field of view of the camera, wherein the dust accumulation sensor assembly is configured to measure dust height continuously via the camera as dust accumulates on the sample area in an uneven distribution between the first edge and the second edge; and
    wherein the dust accumulation sensor assembly is configured to generate a signal based on the dust height.

19. The continuous dust accumulation monitoring system of claim 18, wherein the first edge and the second edge are in the field of view of the camera.

20. The continuous dust accumulation monitoring system of claim 18, wherein the uneven distribution of the dust is in the field of view of the camera.

* * * * *